UNITED STATES PATENT OFFICE.

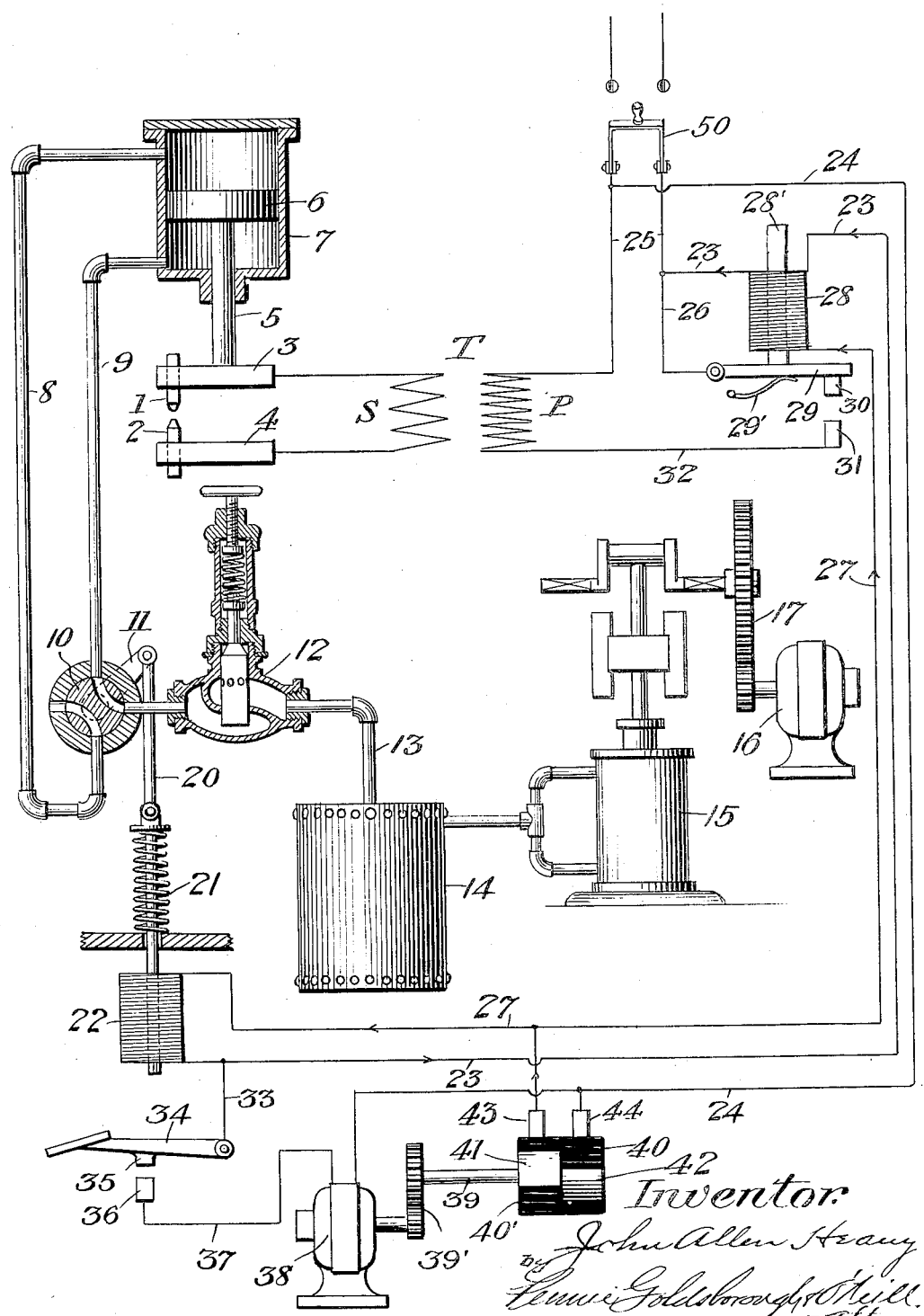

JOHN ALLEN HEANY, OF NEW YORK, N. Y.

ELECTRIC WELDING APPARATUS.

1,153,384.  Specification of Letters Patent.  Patented Sept. 14, 1915.

Application filed July 20, 1915. Serial No. 40,944.

*To all whom it may concern:*

Be it known that I, JOHN ALLEN HEANY, a citizen of the United States, residing in the city, county, and State of New York, have invented certain new and useful Improvements in Electric Welding Apparatus; and I do hereby declare the following to be a full, clear, and exact description of the invention, such as will enable others skilled in the art to which it appertains to make and use the same.

The invention relates to electric welding apparatus of the spot welding type, involving means for accurately and adjustably regulating the pressure imposed upon the work by the electrodes, at the welding point, associated with means for accurately and definitely regulating the duration of the welding current between the electrodes, so as to produce uniform, homogeneous welds.

To these ends, the invention comprises welding electrodes relatively movable toward and from each other to engage the work, one of said electrodes preferably being stationary and the other having a capability of movement toward the stationary electrode to clamp the work and exert a predetermined pressure thereon, the movable electrode being associated with fluid pressure means for effecting the necessary movement of said electrode and imposing thereon a predetermined pressure, which is transmitted to the work at the welding point, means for regulating and adjusting the fluid pressure to produce the exact predetermined amount of force or pressure exerted by the movable electrode on the work, an adjustable timing device to regulate the duration of the welding current, and means, preferably under the control of the operator, for regulating and controlling the operation of the fluid pressure means and the timing device.

The invention is illustrated in the accompanying drawings, in which, the figure is a diagrammatic representation of a machine for effecting the desired objects, some of the parts of the machine being shown in section.

In the art of electrical spot welding, it is highly essential that the several welds be absolutely uniform and that each weld be homogeneous throughout. In order to effect these desirable results, it is necessary that the welding current be uniform and that it be maintained for a definite time interval for each weld, and it is also essential that the pressure imposed upon the work at the point of welding, by the electrodes, be absolutely equal and uniform for all of the welds. In welding similar metals of varying thickness, it is essential to vary and regulate either the pressure imposed at the weld or the duration of the welding current, or both of these elements. For example, in welding relatively thin sheet metal sections, comparatively light pressure and a current flow of brief duration may be found necessary, while in the case of relatively heavy metal sections, a greater degree of pressure, and in some cases, a longer period of flow of the welding current will be found necessary, and while it has been suggested, heretofore, to provide a welding machine with means for regulating the pressure imposed by the electrodes on the work at the weld, and it has also been proposed to provide welding machines with a timing device to regulate the duration of the welding current for each operation of the machine, yet, so far as is known, the applicant is the first to provide a machine of the character described with means for quickly and accurately adjusting the same to regulate the pressure imposed by the electrodes at the welding points, as well as the duration of the welding current, associated with means for controlling the operation of these two coördinated features of the apparatus. It will be understood that the machine involving these structural and operative features as illustrated, is merely diagrammatic and exemplifies a typical arrangement of coördinated parts and devices, which may be applied to any of the standard types of spot welding machines by any one skilled in the art.

Referring to the drawings, 1 and 2 represent the welding electrodes, which may be of any preferred and ordinary form employed in spot welding, the lower electrode 2 preferably being mounted upon a fixed support and the upper electrode 1 being carried by a support 3 secured to the end of a rod 5 connected with a piston 6 operating in a fluid pressure cylinder 7. Each of the electrodes 1 and 2 is connected to a terminal of the secondary S of a step-down transformer T having a primary P, the said secondary consisting of a few turns of a heavy conductor, while the primary consists of a relatively large number of turns adapted to be included in circuit with a source of supply of alternating current.

The fluid pressure motor or actuating device, consisting of the cylinder 7 and piston 6 may be supplied with fluid pressure of any desired character, but is preferably operated by compressed air, the motive fluid being supplied to alternate ends of the cylinder, by means of pipes 8 and 9, the supply and exhaust being controlled by means of an ordinary four-way valve 10, which is actuated by a lever 11. As illustrated, the valve is of the ordinary turning plug type having two passages therein adapted to connect the alternate ends of the cylinder by way of pipes 8 and 9, either with the source of fluid pressure or with the exhaust. When the valve 10 is turned to connect the upper part of the cylinder by way of pipe 8 with the fluid pressure, the piston 6 is forced down carrying with it the movable electrode 1 and applying the latter to the work with a pressure commensurate with the fluid pressure acting on the upper face of the piston. At the same time, the pipe 9 is open to the atmosphere through the exhaust passage of the valve 10. In order to reverse the movement of the fluid pressure motor and lift the electrode 1 from the work, the valve is reversed, preferably by spring action, to be hereinafter described, to connect the lower end of the cylinder by way of pipe 9 with the fluid pressure source and simultaneously open the upper end of the cylinder to the exhaust by way of pipe 8.

The fluid pressure is preferably supplied to the system by means of a double acting pump 15, connected by suitable gearing 17 to an electric motor 16, the pump 15 delivering the compressed air into a reservoir 14 connected with valve 10 by means of a pipe 13, in which is interposed a suitable pressure regulating valve 12 of any desired type, by means of which the pressure of the fluid delivered to the cylinder 7 of the motor may be accurately regulated and definitely fixed.

The motor controlling valve 10 is preferably operated by means of a lever 11 attached to one end thereof, which is connected to a jointed rod 20, the lower end of which constitutes the movable core or armature of a solenoid 22, the parts being so arranged that when the solenoid is energized, the rod will be drawn downward to rotate the valve through an angle of 90°. Surrounding the lower portion of the rod 20 is a helical spring 21 which tends to lift the rod and turn the valve 10 to the position illustrated in the figure, in which fluid pressure is supplied to the lower end of the cylinder 7 to lift the movable electrode, and simultaneously to open the upper end of the cylinder 7 to the exhaust through said valve 10, the latter operations occurring when the solenoid 22 is deënergized by breaking the circuit through the same.

Mounted upon a suitable portion of the machine frame is an adjustable timing device, which regulates the duration of the current flowing between the electrodes 1 and 2, and therefore through the work to be welded. Said timing device is in its general construction and application like that shown in my prior Patent, No. 1,061,378, dated May 13, 1913, and consists of a rotating cylinder having two relatively adjustable sections 40 and 40′, of insulation, carrying segmental conductor sections 41 and 42, adapted to overlap to any desired extent, associated with two brushes 43 and 44 engaging the surface of the cylinder and therefore serving to complete a circuit through the timing device when the brushes are in contact with the two segments 41 and 42, the period of duration of the circuit closure being determined by the degree of overlap of the conducting segments 41 and 42, as fully explained in the prior patent aforesaid. The cylindrical element of the timing device is adjustably mounted on a shaft 39 which is connected by suitable reducing gears 39′ to an electric motor 38. One terminal of said motor 38 is connected to a supply main 25 by means of conductor 24, and the other motor terminal is connected by a lead 37 to contact 36 of a foot lever 34 having a contact 35 coöperating with fixed contact 36, which in turn is connected by lead 33 with a lead 23, connected to one terminal of solenoid 22 and at its opposite end to main 26. The other terminal of solenoid 22 is connected by lead 27 with one terminal of a solenoid 28 which constitutes the operating means of the circuit maker or automatic switch controlling the circuit to the primary P of the transformer T, the other terminal of said solenoid 28 being connected by lead 23 to main 26. The brushes 43 and 44 of the timing device are connected respectively to leads 24 and 27, and therefore serve to close a circuit from mains 25 and 26, through solenoids 22 and 28, in parallel with each other, when the said brushes 43 and 44 are in engagement with the conductor segments 41 and 42 of the timing device.

The automatic circuit maker or switch controlling the primary of the transformer, comprises the solenoid 28, included in the circuit just described, having a movable core 28′, attached to a switch lever 29, which is connected to the main conductor 26, said switch lever 29 carrying on its outer end a contact 30 adapted to be moved into engagement with a fixed contact 31, which is connected by lead 32 with one terminal of the primary P of the transformer, the other terminal of said primary being connected directly to the main lead 25. The switch lever 29 is ordinarily held in retracted position by means of a spring or the like 29′, but when the solenoid 28 is actuated, the core 28 thereof is drawn downward and closes the primary circuit through contacts 30 and 31. The leads 25 and 26 are provided with an ordinary hand switch 50 for connecting the same with the source of supply of alternating current, as will be understood.

The operation of the machine is as follows: The motor 16 operates to maintain a certain predetermined pressure in the reservoir 14, and the operation of said motor 16 may be controlled by any suitable automatic means to cut said motor in and out of circuit, as will be understood by those skilled in the art. The work to be welded is inserted by the operator between the electrodes 1 and 2, and the switch lever 34 depressed by the foot of the operator to close contacts 35 and 36, which completes the circuit to electric motor 38 and starts the timing device to rotate. As soon as the two conductor segments 41 and 42 of the timing device engage the brushes 43 and 44, they close parallel circuits from the mains 25 and 26 through the solenoids 22 and 28, respectively, as follows:—from main 25, through lead 24, to brush 44, segment 42, to segment 41, to brush 43, to lead 27, whence the current divides, part flowing through the right hand portion of lead 27, to and through solenoid 28, by lead 23, to main 26, the other portion of the current flowing through the left hand section of lead 27, through solenoid 22, thence by lead 23, to main 26. The effect of this operation is to cause solenoid 22 to exercise a downward pull on rod 20 and rotate valve 10 through 90°, thereby opening up connection between the pressure reservoir 14, by way of pipe 13, pressure regulating valve 12, pipe 8, to the upper portion of cylinder 7, causing piston 6 to descend and force electrode 1 into contact with the work with a degree of pressure exactly determined by the energy of the fluid pressure medium acting on said piston, which is in turn fixed by the adjustment of the pressure regulating valve 12. At the same time, solenoid 28 is energized to close the circuit to the primary P of the transformer T, by forcing switch lever 29 downward and causing contact 30 to engage contact 31 so that the current flows from main 25 to the primary P, thence by lead 32 to contact 31, thence to contact 30, switch lever 29 to lead 26. It will be particularly noted that the solenoids 22 and 28 are energized just so long as brushes 43 and 44 are in engagement with two conductor segments 41 and 42 of the timing device, and as soon as either of the brushes disengages its corresponding conductor segment, the circuit through the solenoids 22 and 28 is immediately broken. As the circuit controller consisting of the solenoid 28 and its appurtenant parts is lighter and more rapid in its action than the fluid pressure motor consisting of piston 6 and cylinder 7, and its controlling valve 10, it will be apparent that the circuit to the transformer is broken at contacts 30 and 31, before any movement of welding electrode 1 from the work is possible so that sparking or arcing between the welding electrodes of the work is obviated and danger of burning the work is completely avoided. As soon as the circuits to the solenoids 22 and 28 are broken at the brushes 43 and 44, the spring 29′ of the primary circuit controller forces the solenoid core upward and disengages contacts 30 and 31, thereby breaking the circuit to the primary of the transformer. Simultaneously, the spring 21 begins to move rod 20 upward and starts to rotate the valve 10, to ultimately establish connection between the lower portion of cylinder 7 and the fluid pressure source and open the upper portion of cylinder 7 to exhaust by way of pipe 8.

The foregoing operation is repeated for each successive weld, and inasmuch as the apparatus is capable of extremely rapid operation, it will be apparent that the welds may be effected with extreme celerity and at the same time with certainty that all the welds will be uniform in character and homogeneous in union. If it is desired to alter and regulate either the pressure exerted by the movable electrode on the work or the duration of the welding current, or both of these factors, the result may be obtained by simply adjusting the regulator valve 12 to admit the requisite pressure of the fluid medium to the cylinder 7, on the one hand, and adjusting the movable members of the timing device to bring the conductors 41 and 42 to a greater or less degree of overlap, and thereby to increase or decrease the period of duration of the closure of the electric circuits through solenoids 22 and 28, and therefore the duration of the welding current flowing through the electrodes, as well as the duration of the pressure imposed by the fluid pressure motor on the movable electrode and therefore on the work at the point of the weld. The necessary regulation of the fluid pressure supplied to the motor for operating the movable electrode and also the adjustment of the timing device to determine the period of flow of the welding current may be readily effected by an ordinary workman, as the adjustment of the pressure regulating valve and of the timing device requires no special degree of skill or experience.

What I claim is:—

1. Electric welding apparatus comprising relatively movable welding electrodes, fluid pressure means for effecting the movement thereof and imposing a predetermined pressure of the electrodes on the work, means for regulating the fluid pressure, an adjustable timing device to regulate the duration of the welding current, and mechanism for controlling the operation of the fluid pressure means and the timing device.

2. Electric welding apparatus comprising relatively movable welding electrodes, a fluid pressure motor for effecting the movement thereof and imposing a predetermined pressure of the electrodes on the work, means for regulating the fluid pressure supplied to said motor, an adjustable timing device to regulate the duration of the welding current, and means actuated by the operator for controlling the fluid pressure supply to the motor and the timing device.

3. Electric welding apparatus comprising a stationary electrode, a movable electrode, a fluid pressure motor for actuating the movable electrode and imposing a predetermined pressure on the work, means for regulating the pressure of the motive fluid, an adjustable timing device to regulate the duration of the welding current, and operator-controlled means for controlling the fluid pressure supplied to the motor and the timing device.

4. Electric welding apparatus comprising a stationary electrode, a movable electrode, a fluid pressure motor for actuating the movable electrode and imposing a predetermined pressure on the work, a fluid pressure supply for said motor, a pressure regulating device between the motor and the source of supply, an adjustable timing device to regulate the duration of the welding current, and electric means for controlling the fluid supply for the motor and the operation of the timing device.

5. Electric welding apparatus comprising a stationary electrode, a movable electrode, a fluid pressure motor for actuating the movable electrode and imposing a predetermined pressure on the work, means for regulating the pressure of the motive fluid, a transformer having its secondary in circuit with said electrodes, an electro-magnetic switch in circuit with the primary of said transformer, a valve controlling the supply of fluid pressure to said motor, a magnet for operating said valve, an adjustable timing device for controlling the circuit of said magnetic switch and of said valve actuating magnet, and electrical means for controlling the operation of said timing device.

In testimony whereof I affix my signature, in presence of two witnesses.

JOHN ALLEN HEANY.

Witnesses:
VIOLA B. SMITH,
T. R. HILTON.